United States Patent [19]

Long et al.

[11] 4,226,273
[45] Oct. 7, 1980

[54] NONPNEUMATIC TIRE AND RIM ASSEMBLY

[75] Inventors: Barry W. Long, Copley; Grover W. Rye, Cuyahoga Falls, both of Ohio

[73] Assignee: The Goodyear Tire & Rubber Company, Akron, Ohio

[21] Appl. No.: 920,668

[22] Filed: Jun. 30, 1978

[51] Int. Cl.³ ............................................. B60C 7/00
[52] U.S. Cl. ................................... 152/326; 152/403
[58] Field of Search ................... 152/5, 7, 17, 21, 22, 152/28, 47–52, 318–322, 323–329, 379.1, 379.2, 384, 302, 303, 315, 402, 403

[56] References Cited

U.S. PATENT DOCUMENTS

| | | | |
|---|---|---|---|
| 848,745 | 4/1907 | Hopkinson | 152/384 |
| 1,169,746 | 1/1916 | Lighthouse | 152/384 |
| 1,466,133 | 8/1923 | Lundstrom | 152/328 |
| 1,495,083 | 5/1924 | Krusemark | 152/326 |
| 2,488,764 | 11/1949 | Courtney | 152/323 |
| 2,525,196 | 10/1950 | Bacon | 152/323 |

FOREIGN PATENT DOCUMENTS 796113  6/1958  United Kingdom ........................ 152/7
1060467  3/1967  United Kingdom ..................... 152/323

*Primary Examiner*—H. Grant Skaggs
*Attorney, Agent, or Firm*—Frederick L. Lacher; Frank Pincelli

[57] ABSTRACT

A nonpneumatic tire with generally cylindrical inner and outer members connected by radial wall members mounted on a split rim with tire-retaining flanges and a generally cylindrical tire-supporting surface. The diameter of at least some portions of the rim tire-supporting surface is greater than the diameter of adjacent portions of the inner member of the tire for nonrotatable engagement of the tire by the rim in the mounted condition. The tire may include a layer of compressible material spaced radially inward from a reinforcing ply embedded in the inner member. The tire and rim may also have transversely extending, circumferentially spaced-apart ribs and grooves in meshing engagement to prevent rotation of the tire relative to the rim.

6 Claims, 7 Drawing Figures

NONPNEUMATIC TIRE AND RIM ASSEMBLY

This invention relates generally, as indicated, to a tire and rim assembly in which a nonpneumatic tire is mounted on a rim and has a construction and relationship with the rim so that torque is transmitted between the tire and rim for power transmission and braking without slippage of the tire on the rim. The nonpneumatic tire of the type which requires this torque transmission has a generally cylindrical inner member, a generally cylindrical outer member spaced radially outward of the inner member and radial wall members between the inner and outer members. This type of nonpneumatic tire is mounted on a generally cylindrical rim and there has been a problem of preventing relative rotation or slippage of the tire and the rim without clamping the tire or using fasteners. Without adequate resistance to relative rotation of the tire on the rim, the tire will slip when torque is applied during transmission of power or during braking. This not only adversely affects the operation of the vehicle on which the tire is mounted but the slippage can damage the tire and cause failure of the tire and damage to the vehicle.

With the foregoing in mind, it is the principal object of this invention to provide for mounting a generally cylindrical inner member of a nonpneumatic tire on a generally cylindrical rim and at the same time provide for nonrotatable engagement of the tire with the rim.

Another object is to provide a tire construction in which the generally cylindrical inner member of the tire is held against the rim with sufficient force to prevent slippage.

A further object is to provide reinforcement of the generally cylindrical inner member to provide the necessary force against the rim.

A still further object is to provide for an inner surface on the generally cylindrical inner member of the tire which will be compressible upon mounting of the tire on the rim.

Another object is to provide for making the tire of a size which will be compressed during mounting on the rim and produce a compressive force against the rim.

A further object is to provide a configuration of the tire and rim surfaces for meshing engagement to prevent slippage.

A still further object is to provide a reinforcement for the generally cylindrical inner member positioned radially outward of a layer of compressible material and the rim surface for holding the compressible material against the rim in nonrotatable engagement.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but several of the various ways in which the principles of the invention may be employed.

Figure 1:
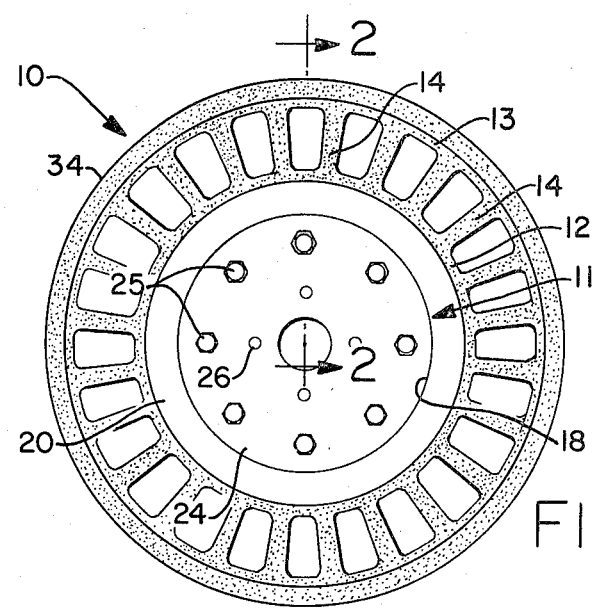
FIG. 1 is a side elevation of a tire and rim assembly embodying the invention.
Figure 2:
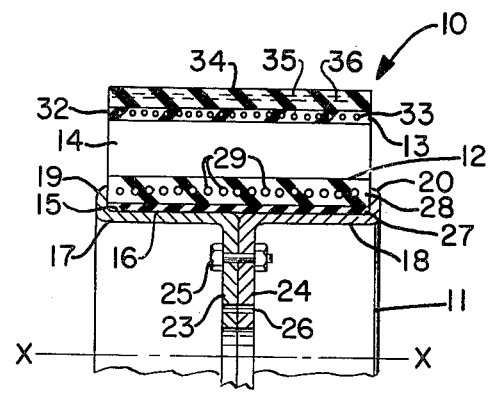
FIG. 2 is a fragmentary sectional view taken along the plane of line 2—2 in FIG. 1.
Figure 3:
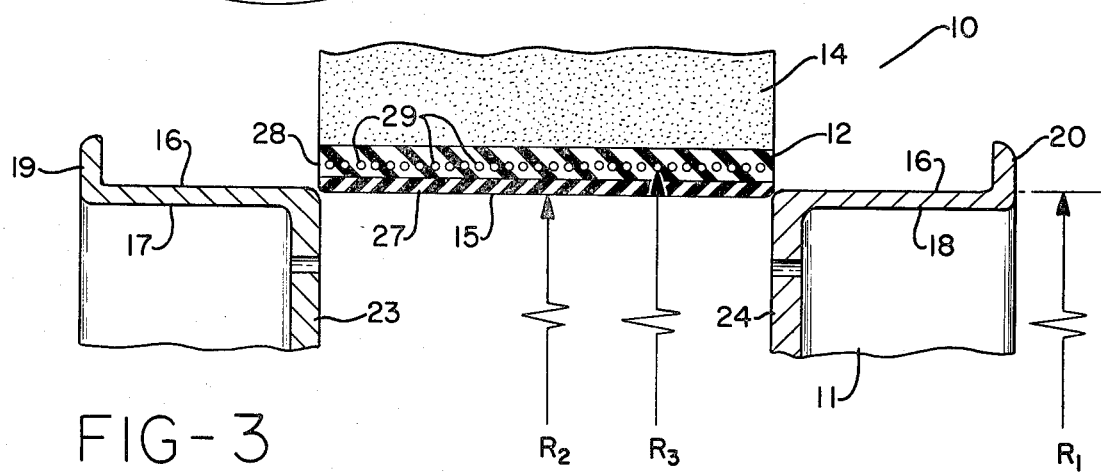
FIG. 3 is an enlarged fragmentary view like FIG. 2 but showing the tire and rim prior to assembly.

Referring to FIGS. 1, 2 and 3, a nonpneumatic tire and rim assembly is shown in which a tire 10 of resilient elastomeric material is mounted on a annular rim 11. The tire 10 and rim 11 are rotatable about an axis X—X which may be the axis of the wheel (not shown) on which the rim is mounted. The tire 10 is of a nonpneumatic type similar to that described in copending U.S. patent application Ser. No. 920,666 on Tire With Supporting and Cushioning Walls which are concurrently filed with this application. The tire 10 includes a generally cylindrical inner member 12 at the inner periphery, a generally cylindrical outer member 13 spaced radially outward from the inner member and connecting radial walls 14 between the inner and outer members. The tire 10 may be of a moldable polymeric material such as natural rubber, styrene butadiene rubber, polybutadiene rubber or EPDM rubber or a blend of two or more of these rubbers which can be utilized in either injection molding or compression molding.

The tire 10 has an inner rim-engaging surface 15 on the inner member 12 for seating on a tire-supporting surface 16 of the rim 11. The rim 11 may be of a split type with rim sections 17 and 18 having tire-retaining flanges 19 and 20 at the edges and central flanges 23 and 24. Circumferentially spaced holes may be provided in the flanges 23 and 24 through which bolt and nut assemblies 25 may be inserted to hold the rim sections 17 and 18 together. Other holes 26 in the flanges 23 and 24 may be provided for fastening the rim 11 to a wheel (not shown).

The rim 11 is preferably of a substantially rigid material such as steel. The tire-supporting surface 16 has a radius $R_1$ which is greater than radius $R_2$ of the rim-engaging surface 15 of the tire 10 so that when the tire is mounted on the rim 11 the inner member 12 will be placed in tension and urge the rim-engaging surface against the tire-supporting surface to hold the tire in nonrotatable engagement with the rim as shown in FIGS. 2 and 3. The rim-engaging surface 15 may be covered with a layer of compressible material 27 which preferably is of a material having a greater compressibility than the material of the inner member 12 and will be readily compressible upon mounting of the tire 10 on the rim 11. As shown in FIG. 3, the thickness $T_1$ of the layer of compressible material 27 is greater than the difference between the radius $R_1$ of the tire-supporting surface 16 and the radius $R_2$ of the rim-engaging surface 15. Accordingly, when the tire 10 is mounted on the rim 11, the layer of compressible material 27 is compressed and the stretching of the inner member 12 may be kept to a minimum.

The inner member 12 is reinforced with ply 28 of cords 29 extending circumferentially of the inner member and having a high modulus of elasticity to limit the stretching of the inner member. Preferably the ply 28 is located at a distance $R_3$ from the axis X—X of the tire 10 which is greater than the radius $R_1$ of the tire-supporting surface 16 of the rim 11 so that upon mounting of the tire on the rim the layer of compressible material will be held in compression against the rim by the cords 29 of the ply.

The outer member 13 may be reinforced by a ply 32 of reinforcing cords 33 having a high modulus of elasticity and extending circumferentially of the tire 10. A generally cylindrical tread member 34 may be mounted around the outer surface of the outer member 13 and adhered thereto by an adhesive or vulcanized to the outer member. Reinforcing plies 35 and 36 may be embedded in the tread member 34 in overlapping relationship and may have cords of high modulus elasticity extending at a bias angle to the circumferential direction of the tire.

The tire 10 is mounted on the rim 11 by placing the tire between the rim sections 17 and 18 as shown in FIG. 3 and then bringing the rim sections together to the positions shown in FIG. 2. During this process, the layer of compressible material 27 is pushed radially outward against the inner member 12 and sandwiched under compression between the rim 11 and inner member. The ply 28 resists stretching of the inner member 12 and maintains the compression of the layer of compressible material 27 so that upon application of torque through braking or driving of the wheel on which the rim 11 is mounted, the tire 10 will be held in nonrotatable engagement.

In the embodiment shown in FIGS. 1 through 3, the radius R1 of the rim tire-supporting surface 16 is 2.6 inches and the radius R2 of the tire rim-engaging surface is 2.5 inches. The layer of compressible material 27 has a thickness T1 of 0.2 inch so that upon mounting of the tire 10 on the rim 11 the layer of compressible material will be compressed to a thickness of 0.1 inch. Also, as shown in FIG. 3, the radius R3 of the ply 28 is around 2.75 inches, to restrict the stretching of the inner member 12 upon mounting of the tire 10 on the rim 11.

Figure 4:
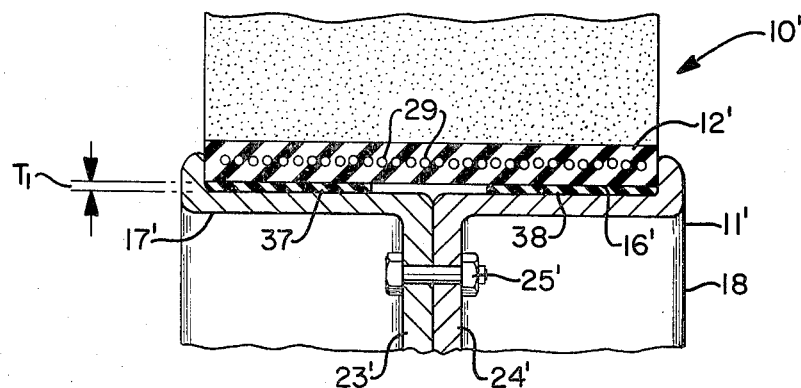
FIG. 4 is an enlarged fragmentary sectional view like FIG. 2 of a modification of the invention.
Figure 5:
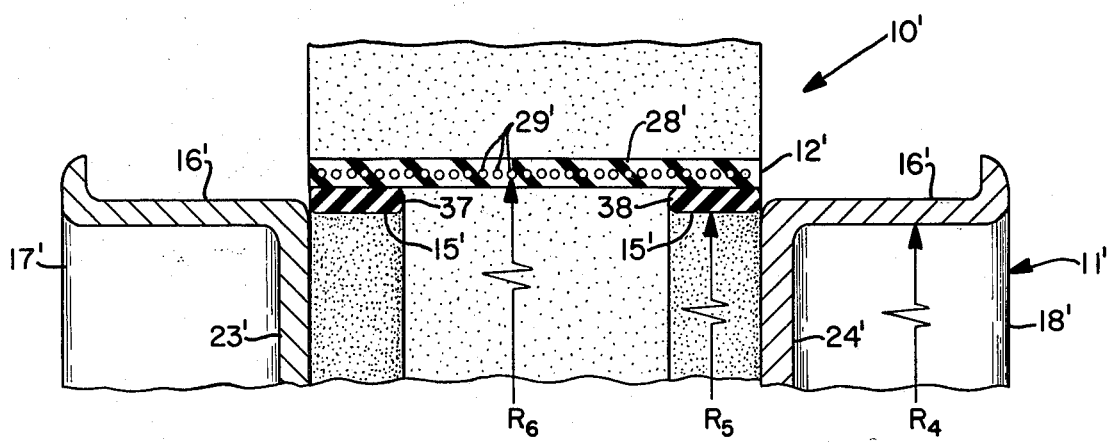
FIG. 5 is a fragmentary sectional view like FIG. 4 showing the tire and rim prior to assembly.

Referring to FIGS. 4 and 5, a modification of the invention is shown in which a tire 10' is mounted on a rim 11'. The rim 11' is of a split rim having sections 17' and 18' with a tire-supporting surface 16'.

The tire 10' has the same general construction of the tire 10 described hereinabove and shown in FIGS. 1, 2 and 3, except the layer of compressible material is divided into two compressible strips 37 and 38 located at the edges of inner member 12'. The inner member 12' is reinforced by a ply 28' of cords 29' having a high modulus of elasticity and extending generally circumferentially of the tire 10'. As shown in FIG. 5, the radius R4 of the rim tire-supporting surface 16' is greater than the radius R5 of rim-engaging surface 15' of the tire 10' and the radius R6 of the ply 28' is greater than the radius R4 of the tire-supporting surface.

In the embodiment shown, the radius R4 of the tire-supporting surface 16' is 2.6 inches. The radius R5 of the rim-engaging surfaces 15' of the strips 37 and 38 is 2.5 inches and the radius R6 of the ply 28' is 2.75 inches. Upon mounting of the tire 10' on the rim 11', the rim sections 17' and 18' are pulled together from the position shown in FIG. 5 to the position shown in FIG. 4 compressing the strips 37 and 38 to provide a nonrotatable engagement of the tire 10' with the rim 11'. The rim sections 17' and 18' are held together by bolt and nut assemblies 25' extending through central flanges 23' and 24' at spaced-apart positions circumferentially of the rim 11'.

Figure 6:
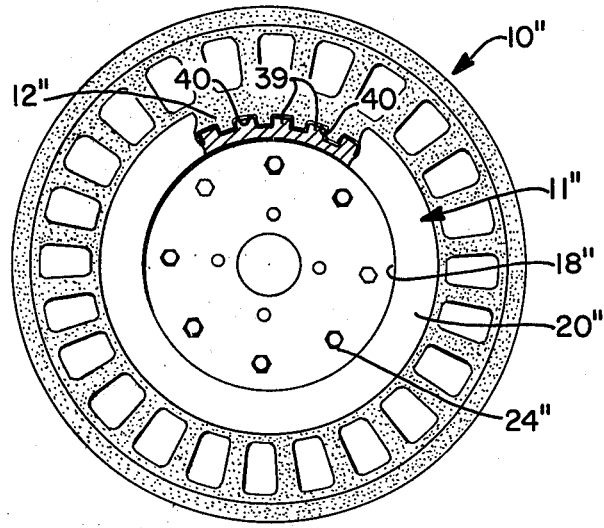
FIG. 6 is a fragmentary side elevation like FIG. 1 of a further modification with parts being broken away.
Figure 7:
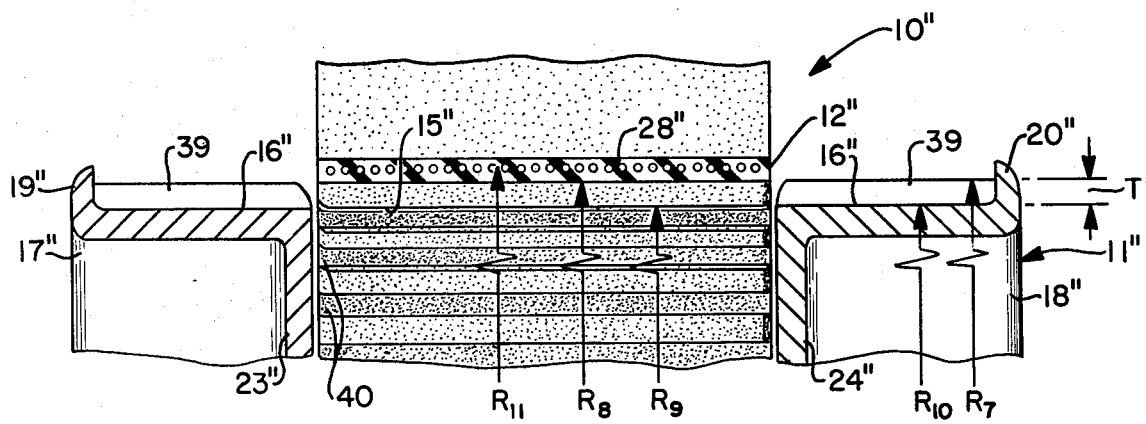
FIG. 7 is a fragmentary sectional view like FIGS. 3 and 5 of the modification shown in FIG. 6.

Referring to FIGS. 6 and 7, a further modification is shown in which a tire 10'' has a construction similar to the tires shown in FIGS. 1 through 5 and described hereinabove. The tire 10'' is mounted on a rim 11'' having a construction similar to the rims shown in FIGS. 1 through 5 and described hereinabove. In this embodiment, the rim sections 17'' and 18'' have tire-supporting surfaces 16'' extending longitudinally around the rim 11'' on which are positioned transversely extending ribs 39 at spaced-apart positions circumferentially of the rim 11''. Inner rim-engaging surface 15'' of the inner member 12'' is generally cylindrical and this surface is interrupted by transversely extending grooves 40 at circumferentially spaced-apart positions around the inner member 12'' so that when the tire 10'' is mounted on the rim 11'' the ribs will extend into the grooves as shown in FIG. 6. Preferably the radius R7 of the outer edges of the ribs 39 is substantially the same as the radius R8 of the grooves 40 and the radius R9 of the rim-engaging surface 15'' is substantially the same as the radius R10 of the tire-supporting surface 16''. The radius R11 of the reinforcing ply 28'' is greater than the radius R7 of the ribs 39 and the radius R9 of the rim-engaging surface 15''.

In mounting the tire 10'' on the rim 11'', the tire is placed between the rim sections 17'' and 18'' and then the sections are brought together with the ribs 39 meshing in the grooves 40 and the edges of the inner member 12'' abutting flanges 19'' and 20'' of the rim sections which may be bolted together by bolt and nut assemblies (not shown) extending through central flanges 23'' and 24''. In the preferred embodiment, the radius R7 of the ribs 39 is 2.7 inches and the thickness T2 of the ribs is 0.1 inch. The radius R8 of the grooves 40 is 2.7 inches and the radius R9 of the rim-engaging surface 15'' is 2.6 inches. The radius R10 of the tire-supporting surface 16'' is 2.6 inches and the radius R11 of the ply 28'' is 2.75 inches so that upon mounting the tire 10'' on the rim 11'', the ribs 39 will mesh with the grooves 40 in nonrotatable engagement.

While certain representative embodiments and details have been shown for the purpose of illustrating the invention, it will be apparent to those skilled in the art that various changes and other modifications may be made therein without departing from the invention.

What is claimed is:

1. A nonpneumatic tire and rim assembly rotatable about an axis comprising an annular rim of substantially rigid material having a generally cylindrical tire-supporting surface, a pair of flanges at the edges of said tire-supporting surface, at least one of said flanges being detachably fastened to said rim for removal to mount and remove said tire, an annular tire of resilient material including a generally cylindrical inner member at the inner periphery, a generally cylindrical outer member spaced radially outward from said inner member, radially extending connecting wall members between said inner member and said outer member, an inner rim-engaging surface on said inner member, said inner member being reinforced by a ply of cords having a high modulus of elasticity extending circumferentially of said inner member and having a radius in the unmounted condition which is greater than the radius of said tire-supporting surface of said rim, and at least a portion of said tire-supporting surface of said rim having a radius greater than radii of adjacent portions of said tire rim-engaging surface in the unmounted condition so that in the mounted condition of said tire on said rim said tire will be held in nonrotatable engagement with said rim.

2. A tire and rim assembly according to claim 1 wherein said adjacent portions of said rim-engaging surface on said inner member include a layer of compressible material for engaging said tire-supporting surface of said rim.

3. A tire and rim assembly according to claim 2 wherein said portion of said rim-engaging surface which includes said layer of compressible material is divided into two strips located at the edges of said inner member.

4. A tire and rim assembly according to claim 1 wherein said portion of said tire-supporting surface of said rim includes transversely extending ribs positioned at circumferentially spaced-apart positions around said rim for engagement with transversely extending grooves in said rim-engaging surface of said inner member.

5. A tire and rim assembly according to claim 1 wherein said rim is split into two rim sections with said flange detachably fastened to said rim including a portion of said tire-supporting surface and fastening means for detachably holding said rim sections together.

6. A tire and rim assembly according to claim 2 wherein the difference in the thickness of said layer of compressible material in the unmounted condition and the thickness in the mounted condition is substantially equal to the difference between the radius of said rim-engaging surface of said tire in the unmounted condition and the radius of said tire-engaging surface of said rim to restrict the stretching of said inner member upon mounting of said tire on said rim.

* * * * *